(12) United States Patent
Vogan

(10) Patent No.: US 8,689,453 B2
(45) Date of Patent: Apr. 8, 2014

(54) COOKING UTENSIL

(76) Inventor: Jacob Vogan, Pinckney, MI (US)

( * ) Notice: Subject to any disclaimer, the term of this patent is extended or adjusted under 35 U.S.C. 154(b) by 77 days.

(21) Appl. No.: 13/506,918

(22) Filed: May 24, 2012

(65) Prior Publication Data

US 2013/0312268 A1   Nov. 28, 2013

(51) Int. Cl.
*A47G 21/04* (2006.01)
*A47J 43/28* (2006.01)

(52) U.S. Cl.
USPC .............................................. 30/325; 30/142

(58) Field of Classification Search
USPC ........... 30/324–328, 147, 149, 150, 123, 142; D7/667, 647; 210/470, 471
See application file for complete search history.

(56) References Cited

U.S. PATENT DOCUMENTS

| | | | |
|---|---|---|---|
| 827,101 A * | 7/1906 | Hutchins | 30/325 |
| 902,954 A * | 11/1908 | Felty | 209/419 |
| D71,016 S * | 9/1926 | Hiii | D7/647 |
| 2,391,215 A * | 12/1945 | Zabel et al. | 210/495 |
| D143,450 S * | 1/1946 | Storm | D7/647 |
| 2,773,530 A * | 12/1956 | Sullivan | 30/150 |
| 2,853,195 A * | 9/1958 | Malcolm | 210/471 |
| 3,877,143 A * | 4/1975 | Montesi | 30/114 |
| 4,711,029 A * | 12/1987 | Somerset | 30/148 |
| 5,014,434 A * | 5/1991 | Skerker et al. | 30/345 |
| 5,505,850 A * | 4/1996 | Licari | 210/464 |
| D396,610 S * | 8/1998 | Licari | D7/667 |
| D468,596 S * | 1/2003 | Bluemond | D7/667 |
| D620,768 S * | 8/2010 | Jossem | D7/688 |
| 2008/0206408 A1* | 8/2008 | Amit | 426/82 |
| 2009/0121062 A1* | 5/2009 | Silver et al. | 241/168 |

OTHER PUBLICATIONS

Pruduct brochure for Kizmos Hey Sunshine! Slotted Spoon. Obtained on Apr. 2, 2013 with the product.

* cited by examiner

*Primary Examiner* — Laura M Lee
(74) *Attorney, Agent, or Firm* — John G. Chupa

(57) ABSTRACT

A cooking utensil 10 having a stem or handle 12 and a bowl or containment portion 13 which has a cavity 16 and protruding ridges which may be used to selectively engage, cut and grind an item such as food.

2 Claims, 3 Drawing Sheets

COOKING UTENSIL

GENERAL BACKGROUND

1. Field of the Background

The invention generally relates to a cooking utensil and more particularly to a spoon having a stem and a bowl portion which includes a protruding web or ridged portion and wherein the web or ridges extends away from the bottom surface of the bowl portion and are adapted to selectively engage items, such as food, and are selectively effective to selectively flatten and/or cut and grind up the engaged items.

2. Background of the Invention

A spoon is often used to allow material and/or other items, such as food, to be selectively obtained and then moved to a desired location, such to one's mouth, where the obtained items are consumed. The material and/or other items may alternatively be selectively moved to a pan that is on a stove or a grill. In this regard, a spoon typically includes a stem or handle portion (which allows an individual to grasp and use the spoon) and which integrally terminates into a bowl portion in which the material or item resides. Spoons may also be used to mix material, and spoons are generally manufactured in wide range of sizes.

While prior and current spoons do provide for the foregoing functionality, they do not readily allow items, such as food, to be selectively flattened or cut/grounded. That is, by way of example and without limitation, when cooking an item such as ground meat, it is desirable to selectively cut or grind the meat while browning it in a pan on a stove or a grill. A spoon may be used to transport the meat into the pan, however a different tool must normally then be used to cut or grind the meat since the bowl of a typical spoon is generally flat or smooth. The use of two separate tools increases the overall cost and complexity of the food preparation activity.

It is highly desirable to allow a single utensil to selectively transport items, such as ground meat, to a desired location, such as a pan on a stove or grill, and then allow the same utensil to be effective to selectively cut and grind the previously transported material or item, thereby allowing a single tool to perform multiple functions. The present inventions provide for this desired functionally.

SUMMARY OF THE INVENTIONS

It is a first non-limiting object of the present invention to provide a cooking utensil which overcomes the various previously delineated disadvantages of prior cooking utensils.

It is a second non-limiting embodiment of the present invention to provide a cooking utensil which overcomes the various previously delineated disadvantages of prior cooking utensils and which, by way of example and without limitation, allows items to be selectively cut and ground up.

According to a first non-limiting aspect of the present invention, a cooking utensil is provided and includes a handle portion which terminates into a reception portion, wherein the reception portion includes a reception cavity and a plurality of ridges which project away from the reception cavity.

According to a second non-limiting aspect of the present invention, a cooking utensil is provided and includes a body which comprises a handle portion having a narrow grasping portion and a broad reception portion having a cavity and wherein within the cavity there resides a ridged surface which protrudes from the cavity.

According to a third non-limiting aspect of the present invention, a spoon is provided and includes a stem which extends in a first direction; and a bowl portion which includes a web surface which protrudes in a second direction which is opposed to the first direction.

These and other features, aspects, and advantages of the present inventions will become apparent from a reading of the following detailed description of the preferred embodiment of the inventions, including the subjoined claims, and by reference to the following drawings.

DETAILED DESCRIPTION OF THE PREFERRED EMBODIMENT OF THE INVENTION

Figures 1, 2:
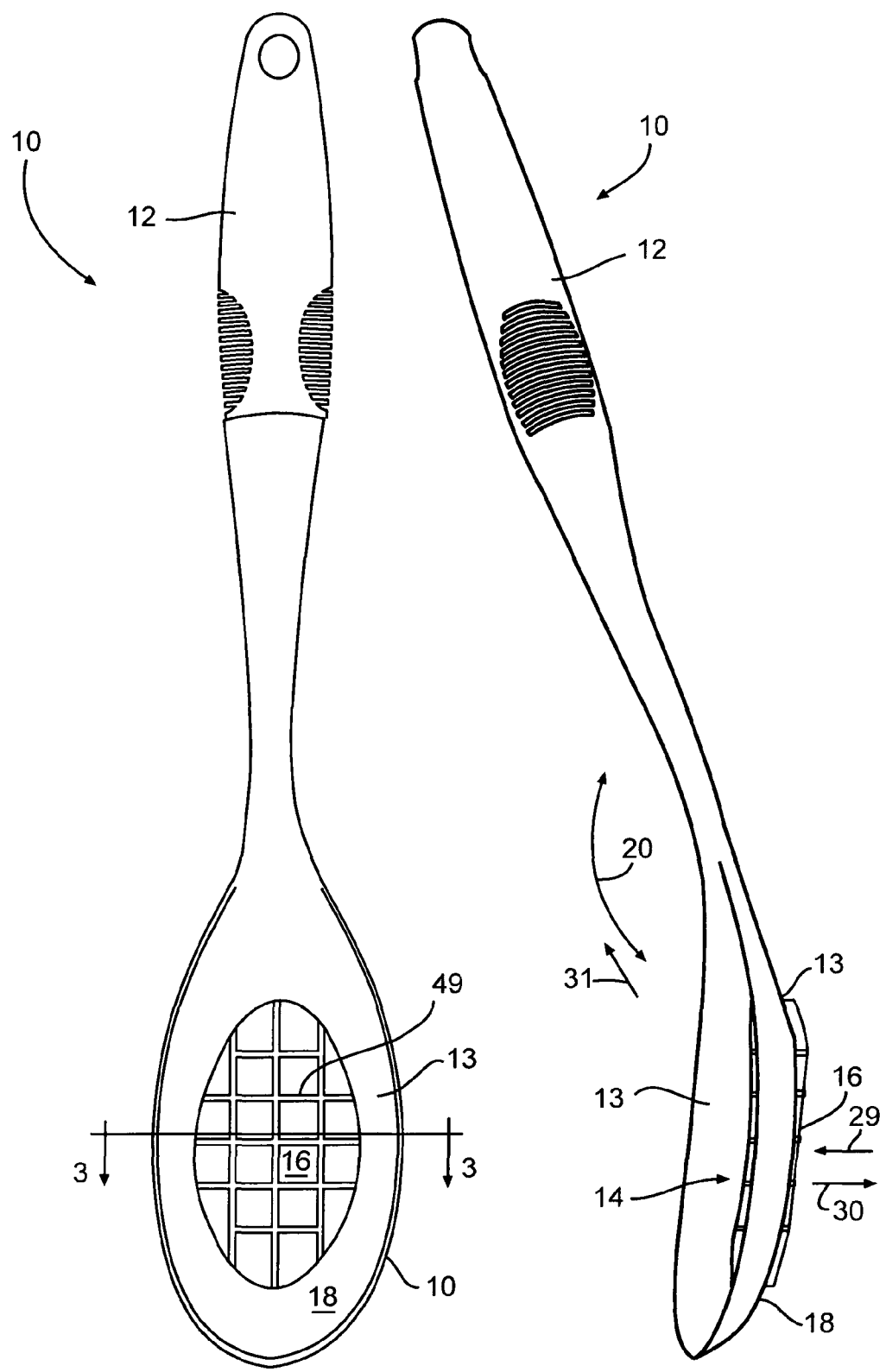
FIG. 1 is a front view of a cooking utensil which is made in accordance with the teachings of the preferred embodiment of the inventions.
FIG. 2 is a side view of the cooking utensil which is shown in FIG. 1.
Figure 3:
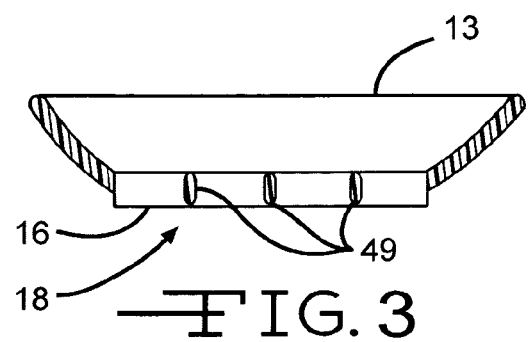
FIG. 3 is a view of the cooking utensil which is shown in FIG. 1 and which is taken along view line 3-3.
Figure 4:
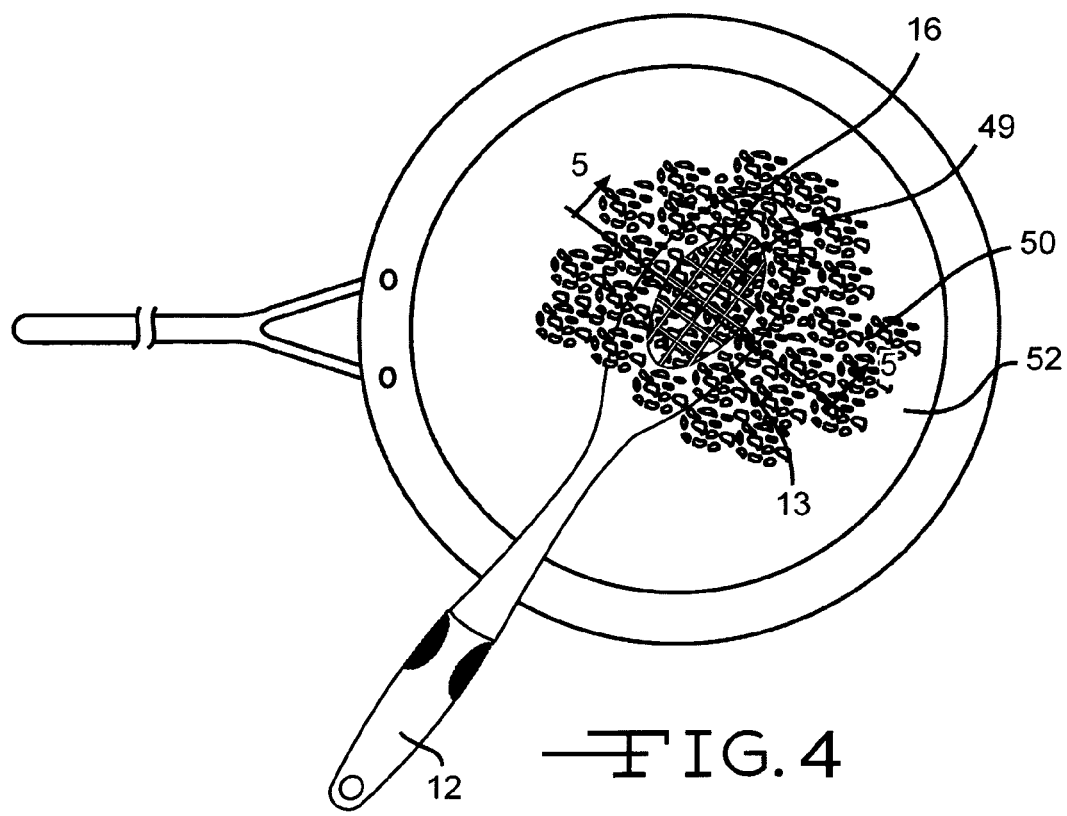
FIG. 4 is a top view of the cooking utensil which is shown in FIGS. 1-3 in combination and in use with meat which resides upon a cooking pan.
Figure 5:
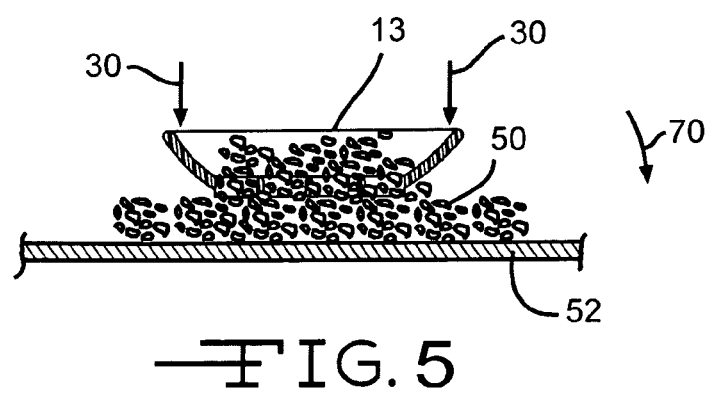
FIG. 5 is a side view of the combination which is shown in FIG. 4.
Figure 6:
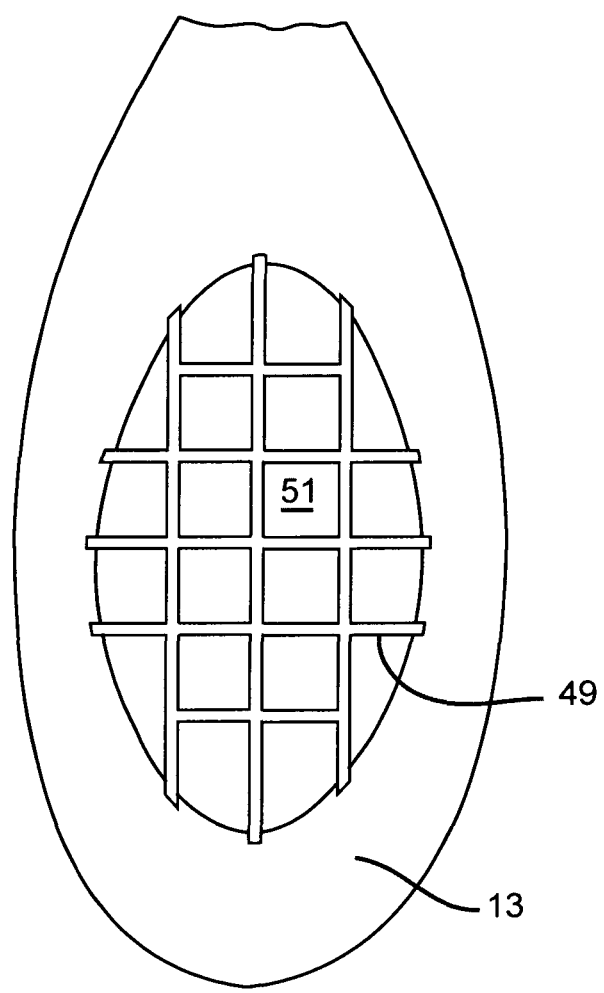
FIG. 6 is a partial bottom view of the cooking utensil taken in the direction of view arrow 29.

Referring now to FIGS. 1-6, there is a cooking utensil 10 which is made in accordance with the teachings of the most preferred embodiment, although non-limiting embodiment, of the invention.

As shown, utensil or spoon 10 comprises a generally elongated handle or stem portion 12 which is generally thin, which is generally and normally adapted to be held or secured by a human hand, and which is arched. Nothing in this description is meant to limit the stem portion 12 to a particular size or shape. The utensil or spoon 10 includes a containment or bowl portion 13 which into which the stem 12 integrally terminates. In this non-limiting embodiment, the bowl portion 13 is generally oval and is generally concave, but other sizes and shapes are contemplated.

The bowl or containment portion 13 includes a cavity 14 (into which material or other items may be selectively placed and transported), having a web or ridged portion 16 which protrudes from and is formed upon bottom surface 18. The portion 16 forms the bottom surface of the cavity 14. The stem or handle portion 12 arches at a certain angle 20 with respect to the containment cavity or bowl 13 and the web or ridge portion 16 extend in a direction 30 away from the cavity 14. The directional vector 30, in one non-limiting embodiment, forms an obtuse angle with respect to the directional vector 31 formed by the direction that the stem 12 extends from bowl 13.

The protruding web or ridged portion 16 includes a plurality of ridges 49 and these plurality of ridges 49 are separated by an open space 51 and these plurality of ridges 49 cooperatively and selectively engage items, such as food 50 which is resident upon a pan or other cooking surface 52, and may cut and grind the engaged item, such as food 50 as the bowl 13 is selectively moved against the items, such as food 50, in a direction 70 against the surface 52. In this regard, the disclosed spoon 10 may selectively receive and transport items, such as food 50, and then selectively grind up the transported items, such as food 50. The portion 16 may be rectangular shaped, formed in the general shape of an oval, or be substantially any other shape. Thus, a unique function of the spoon 10 is the ability to break apart or fragmentize ground meat (or other items) faster and easier than using a traditional spoon which does not have the portion 16 and which utilizes only an edge. Thus, spoon 10 has multiple cutting edges or ridges 49 which help cut the ground meat or other items into fine pieces as the item cooks in a pan or upon another surface. The spoon 10 also provides a small rim 13 which allows the spoon 10 to engage and work with food items. In the most preferred embodiment of the invention, the plurality of ridges 49 form a checkerboard pattern which has been found to allow for a substantially uniform amount of energy and forced applied to the engaged item 50 and the thickness 13 of portion 16 is about one quarter of an inch, although other thicknesses may be utilized.

It is to be understood that that inventions, as set forth in the following claims, are not limited to not the various embodiments which have been delineated above, but that various changes and modifications may be made without departing from the spirit and the scope of the claims. The size and shape of spoon 10 is not limited to that which is shown and any food item may be used such as ground turkey, ground chicken, ground sausage, and ground hamburger.

What is claimed is:

1. A cooking utensil comprising:
an elongated arched handle and a bowl integrally formed at one end of the handle;
wherein said bowl comprises a cavity for containing food defined by an integrally formed bottom side and curving rim, the bottom side defining substantially flat top and bottom surfaces and the curving rim having a substantially smooth inner surface that encloses the bottom side;
wherein said bottom side is formed of a webbed portion having a plurality of elongated, vertically and horizontally extending cutting ridges, the cutting ridges forming a checkerboard pattern defining said substantially flat top and bottom surfaces with open spaces extending between the ridges and through the bottom side into the cavity;
wherein the cutting ridges project away from the cavity in a direction forming an obtuse angle with the handle; and
wherein the curving rim extends upwardly from the top surface of the cutting ridges and the bottom surface extends beyond the rim.

2. A method of grinding food comprising the steps of:
providing a spoon having an elongated arched handle and a bowl integrally formed at one end of the handle;
wherein said bowl comprises a cavity for containing food defined by an integrally formed bottom side and curving rim, the bottom side defining substantially flat top and bottom surfaces and the curving rim having a substantially smooth inner surface that encloses the bottom side;
wherein said bottom side is formed of a webbed portion having a plurality of elongated, vertically and horizontally extending cutting ridges, the cutting ridges forming a checkerboard pattern defining said substantially flat top and bottom surfaces with open spaces extending between the ridges and through the bottom side into the cavity;
wherein the cutting ridges project away from the cavity in a direction forming an obtuse angle with the handle; and
wherein the curving rim extends upwardly from the top surface of the cutting ridges and the bottom surface extends beyond the rim;
using said cutting ridges to grind said food; placing said ground food into said cavity; depositing said ground food upon a cooling apparatus; and cooking said deposited ground food.

\* \* \* \* \*